(12) United States Patent
Hartness et al.

(10) Patent No.: US 6,533,103 B2
(45) Date of Patent: Mar. 18, 2003

(54) TRANSFER DEVICE FOR USE BETWEEN TWO CONVEYORS

(75) Inventors: Thomas P. Hartness, Greenville, SC (US); Robert C. Beesley, Greenville, SC (US); Mark W. Davidson, Greer, SC (US)

(73) Assignee: Hartness International, Greenville, SC (US)

( * ) Notice: Subject to any disclaimer, the term of this patent is extended or adjusted under 35 U.S.C. 154(b) by 0 days.

(21) Appl. No.: 09/917,075

(22) Filed: Jul. 27, 2001

(65) Prior Publication Data

US 2003/0019726 A1 Jan. 30, 2003

(51) Int. Cl.⁷ .......................... B65G 15/26; B65G 17/28
(52) U.S. Cl. .................. 198/594; 198/381.1; 198/479.1
(58) Field of Search ............................ 198/594, 380.1, 198/381.1, 479.1

(56) References Cited

U.S. PATENT DOCUMENTS

| 4,063,632 A | 12/1977 | Neth et al. |
|---|---|---|
| 4,364,465 A | 12/1982 | Kraft et al. |
| 4,413,724 A | 11/1983 | Fellner |
| 4,549,647 A | 10/1985 | Cossé |
| 4,989,718 A | 2/1991 | Steeber |
| 5,277,294 A | 1/1994 | Sherepa |
| 5,413,213 A | 5/1995 | Golz et al. |
| 5,490,589 A | 2/1996 | Golz et. |
| 5,772,005 A | 6/1998 | Hänsch |
| 6,026,947 A | 2/2000 | Persson |
| 6,152,291 A | 11/2000 | Steeber et al. |
| 6,182,812 B1 | 2/2001 | Hartness, III et al. |
| 6,230,874 B1 * | 5/2001 | Steeber et al. ......... 198/457.06 |
| 6,241,074 B1 | 6/2001 | Steeber |
| 6,260,688 B1 * | 7/2001 | Steeber et al. ........... 198/347.4 |
| 6,334,528 B1 * | 1/2002 | Bogle et al. ............. 198/836.3 |

FOREIGN PATENT DOCUMENTS

| DE | 19856649 A1 | 6/2000 |
|---|---|---|
| GB | 831911 | 4/1960 |

* cited by examiner

Primary Examiner—Christopher P. Ellis
Assistant Examiner—Richard Ridley
(74) Attorney, Agent, or Firm—Dority & Manning, P.A.

(57) ABSTRACT

An apparatus for the transfer of articles is provided. The apparatus includes a first conveyor that moves in a first direction and a second conveyor that moves in a second direction opposite from the first direction. The second conveyor is spaced from the first conveyor. A transfer device is substantially disposed between the first and second conveyors. The transfer device includes a transfer plate that is used to transfer articles between the first and second conveyors. The transfer plate overlaps more of the second conveyor than the first conveyor. The transfer plate may be under the first conveyor and over the second conveyor, and the axis of revolution may be in the middle or offset from the middle between the conveyors.

21 Claims, 6 Drawing Sheets

TRANSFER DEVICE FOR USE BETWEEN TWO CONVEYORS

TECHNICAL FIELD

This invention relates generally to a conveyor transport system, and more particularly to a system for transferring articles between oppositely running conveyor belts.

BACKGROUND

Many applications in various fields of manufacturing make use of conveyor belt systems. In particular, oppositely running conveyors disposed side by side are used for transporting articles. A common such use for these types of conveyor belt systems is in an accumulator system that is utilized between an upstream delivery station and a downstream receiving station. Such an accumulator is used to store articles when the capacity of the downstream receiving station is either shut down or run at a speed wherein it cannot handle the number of articles being fed by the upstream station.

Such accumulator conveying systems are known to those skilled in the art. One particular accumulator conveying system is disclosed in U.S. Pat. No. 6,152,291, which is assigned to the assignee of the current invention and is incorporated herein by reference in its entirety. With such accumulator systems, and any other system wherein articles are transferred from one conveyor running in one direction onto another conveyor running in an opposite direction, a device must be provided for controlling the transfer of the articles from the first conveyor to the second.

The '291 patent teaches several different ideas used in transferring an object from one conveyor to another. In one embodiment, the article transfer member is a horseshoe type member having a guide plate with a guide wheel that rotates. The guide plate is located between two oppositely moving conveyor belts. A gear is connected to the guide plate, and the gear is in communication with corresponding teeth on each conveyor belt. If the belts are moving at the same speed, the gear simply rotates at a fixed rate and the guide plate remains stationary. If one belt is moving faster than another, the gear will rotate faster in one direction and hence the guide plate will move in the direction of the faster moving conveyor belt. Such movement may be desired when incorporating such an article transfer device into an accumulator system.

The conveyor belts disclosed in the '291 patent are shown as connected links. Articles that are transported on one conveyor belt contact an end portion of the article transfer member. This end portion is shaped such that articles are directed against the guide wheel. The rotation of the guide wheel and the movement of the first conveyor will move the article through the first portion of the article transfer device.

Once the article is moved off of the first conveyor belt, a dead plate is positioned between the two conveyor belts. The guide wheel urges the object over the dead plate through an intermediate portion of the article transfer device. Once the article contacts the second conveyor belt, the object is urged through the article transfer device by both the second conveyor belt and the guide wheel. Eventually exiting the article transfer device, the article is finally carried solely by the second conveyor in a direction opposite to the first.

Other ways of transferring articles between conveyors are known in the art. For instance, U.S. Pat. No. 6,182,812 B1, which is assigned to the same assignee of the present invention and is herein incorporated by reference in its entirety, teaches one such way. One of the teachings of the '812 patent includes a deflector bar which moves articles to one end and off of the first conveyor. A bridge is placed between the two oppositely moving conveyor belts. Once on the second conveyor belt, a deflector rail properly positions the articles on the belt.

Although these prior art devices work well in their intended applications, it is still sometimes the case that certain articles are not smoothly transferred from the first conveyor belt to the second. The current application provides a novel article transfer device and an improved article transfer device over the current technology.

SUMMARY

Objects and advantages of the invention will be set forth in part in the following description, or may be obvious from the description, or may be learned from practice of the invention.

One aspect of the present invention provides for an apparatus that is used for the transfer of articles. The apparatus includes a first conveyor that moves in a first direction, and a second conveyor that moves in second direction opposite from the first direction. Additionally, the second conveyor is spaced from the first conveyor. A transfer device is substantially disposed between the first and second conveyors. The transfer device includes a transfer plate that is used to transfer articles between the first and second conveyors. The transfer device overlaps more of the second conveyor than the first conveyor. It is to be understood that the transfer device may be under the first conveyor and over the second conveyor.

Another aspect of the present invention may include an apparatus as described above where the transfer plate is a rotating disk.

A further aspect of the present invention may include an apparatus for the transfer of articles as described above where the transfer device has a pinion having an axis of revolution that is between the first and second conveyors. The axis of revolution may be offset from the middle of the space between the first and second conveyors.

Still another aspect of the present invention may include an embodiment where the apparatus for the transfer of articles as described above has an internal gear connected to the drive gear. Here, the pinion is in communication with the internal gear and is connected to the transfer plate.

Another aspect of the present invention includes an embodiment of a transfer device for the transfer of articles from a first conveyor belt to a second conveyor belt. The transfer device includes a transfer plate that is used to transfer articles from the first conveyor belt to the second conveyor belt. The transfer plate overlaps more of the second conveyor belt than the first conveyor belt. It is to be understood that the transfer plate may be under the first conveyor belt and over the second conveyor belt. A guide rail mechanism may be located proximate to the first and second conveyor belts.

A further aspect of the present invention includes an embodiment of the apparatus for the transfer of articles as described above where the transfer device has a drive gear that engages both the first and second conveyor belts.

A still further aspect of the present invention includes an embodiment where the transfer device has a pinion having an axis of revolution that is between the first and second conveyor belts. The axis of revolution may be offset from the middle of the space between. the first and second conveyor belts.

A further aspect of the present invention includes an embodiment where the transfer device has an internal gear connected to the drive gear. Here, the pinion is in communication with the internal gear and is connected to the transfer plate.

Another aspect of the present invention includes an apparatus for the transfer of articles which includes a first conveyor that moves in a first direction. A second conveyor moves in a second direction that is opposite from the first direction. The second conveyor is spaced from the first conveyor. A gear engages both the first and second conveyors, and rotates in response to movement of the first and second conveyors. A drive train transfers rotation from the gear to a transfer plate. A transfer plate is included that rotates. The transfer plate is located substantially between the first and second conveyors, and is used to transfer articles from the first conveyor to the second conveyor. The axis of revolution of the transfer plate may be offset from the middle of the first and second conveyors.

DETAILED DESCRIPTION

Figure 1:
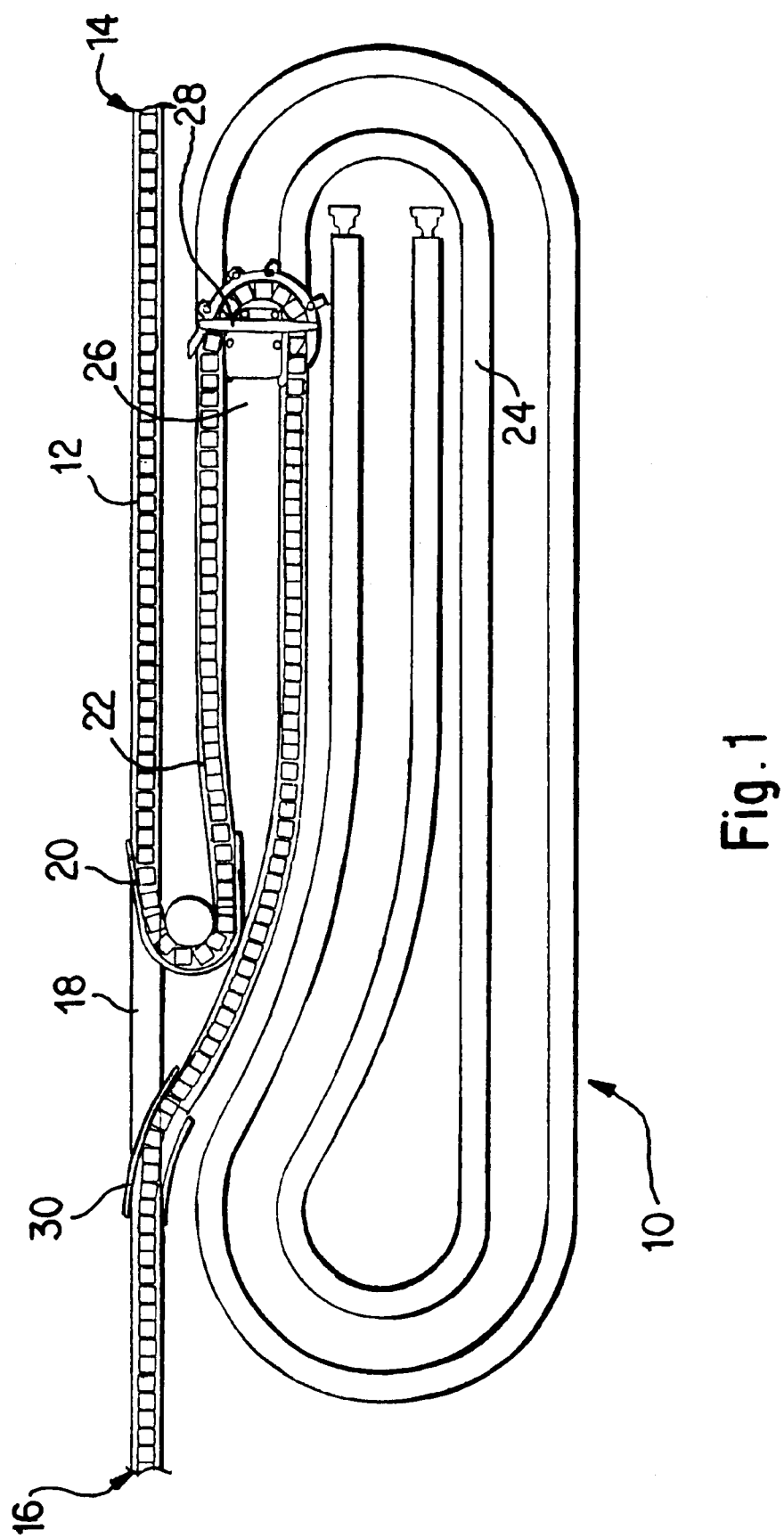
FIG. 1 is a plan view of an embodiment of an apparatus for controlling the flow of articles in accordance with the present invention. The drawing shows articles being diverted onto a first and second conveyor and then returning onto a main conveyor.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Referring now to the drawings, FIG. 1 shows a transfer device 28 that is used on an apparatus for controlling the flow of articles, generally 10, in accordance with one embodiment of the present invention. Articles 12 are fed along a main conveyor 18 from an upstream location 14 to a downstream location 16. An apparatus for controlling the flow of articles 10 is used to provide a buffer for storing articles 12 whenever the downstream location 16 can no longer accept articles 12 for various reasons. A first deflecting rail 20 or other suitable structure is provided in order to move the articles 12 from the main conveyor 18 onto the first conveyor 22, which acts as an infeed conveyor. A second conveyor 24 which acts as an ouffeed conveyor may run essentially parallel to the first conveyor 22. A space 26 is provided between the first conveyor 22 and the second conveyor 24. Articles 12 are transferred from the first conveyor 22 onto the second conveyor 24 by the transfer device 28.

The transfer device 28 may be configured for moving along the first conveyor 22 and the second conveyor 24. Transfer device 28 may be provided with a gear that meshes with both the first conveyor 22 and the second conveyor 24. With such an arrangement, the transfer device 28 will move in the direction of the faster moving conveyor. Articles 12 exiting the transfer device 28 will be carried on the second conveyor 24 and eventually transferred onto the main conveyor 18. A second deflecting rail 30 is provided in order to transfer articles 12 from the second conveyor 24 onto the main conveyor 18.

Figure 2:
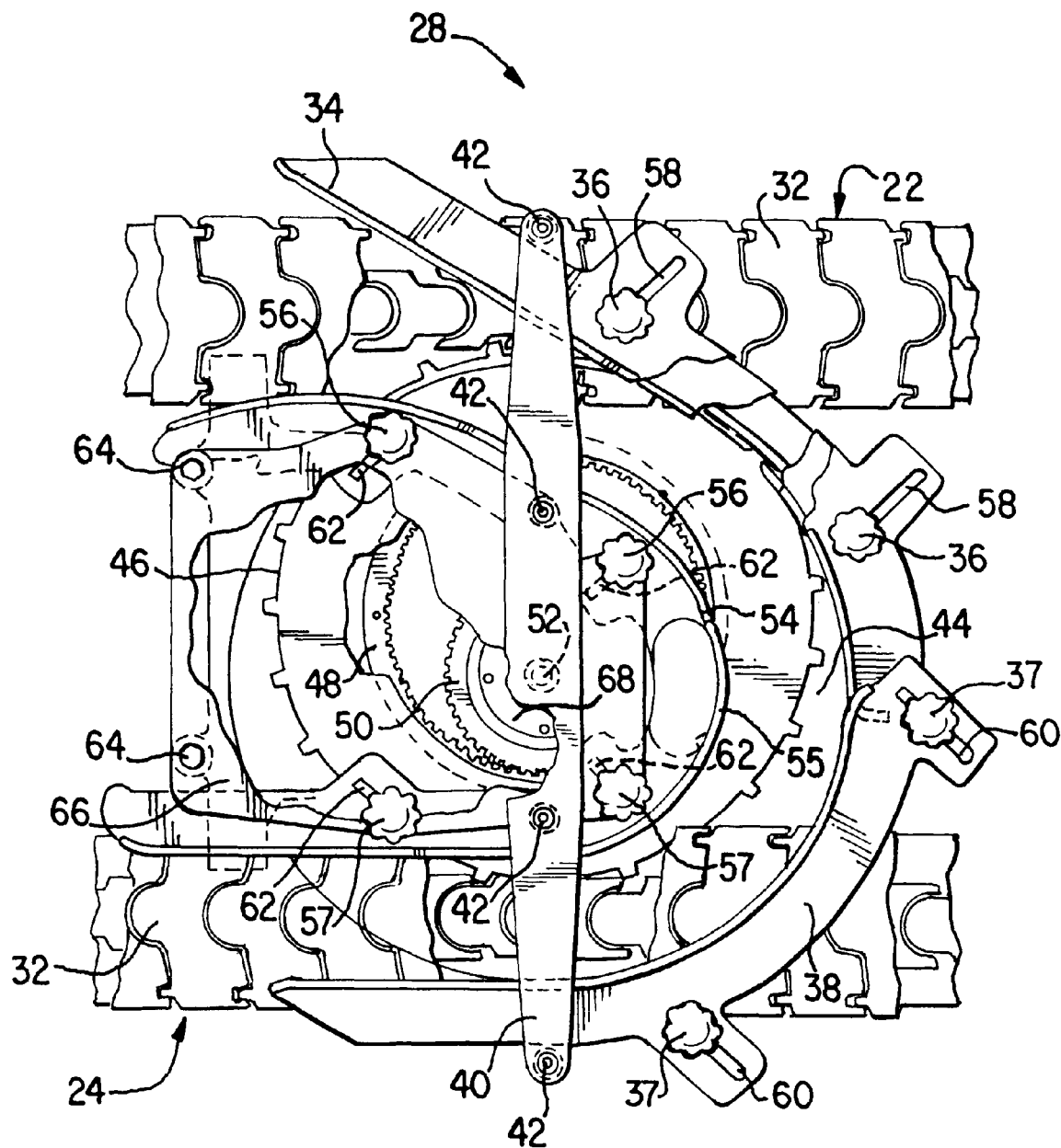
FIG. 2 is a plan view of an embodiment of a transfer device of the present invention. The inner top plate of the drawing is partially cut away to show the gearing contained within the transfer device. The transfer device is substantially positioned between a first and second conveyor.

FIG. 2 shows an embodiment of a transfer device 28 of the present invention located between a first conveyor 22 and a second conveyor 24. First conveyor 22 and second conveyor 24 run in opposite directions, and both are composed of a plurality of interconnected links 32. Such conveyor belts composed of a plurality of links are known in the art, for instance U.S. Pat. No. 6,209,716 discloses such a conveyor belt. It should be appreciated that the invention is not limited to any particular type of configuration of conveyor belt. Objects moving on first conveyor 22 first come into contact with the transfer device 28 at the location of the first guide rail 34. In order to move an article 12 from the first conveyor 22 onto the second conveyor 24, the article 12 is transferred via the transfer plate 44. Transfer plate 44 rotates in a clockwise direction, and eventually deposits the article 12 onto the second conveyor 24.

A guide rail mechanism may be provided that includes a first guide rail 34 and a second guide rail 38. However, it is to be understood that the guide rail mechanism may be of any configuration, such as for instance a single piece rail. All various embodiments of a guide rail mechanism are to be considered under the scope of the present invention.

Figure 4:
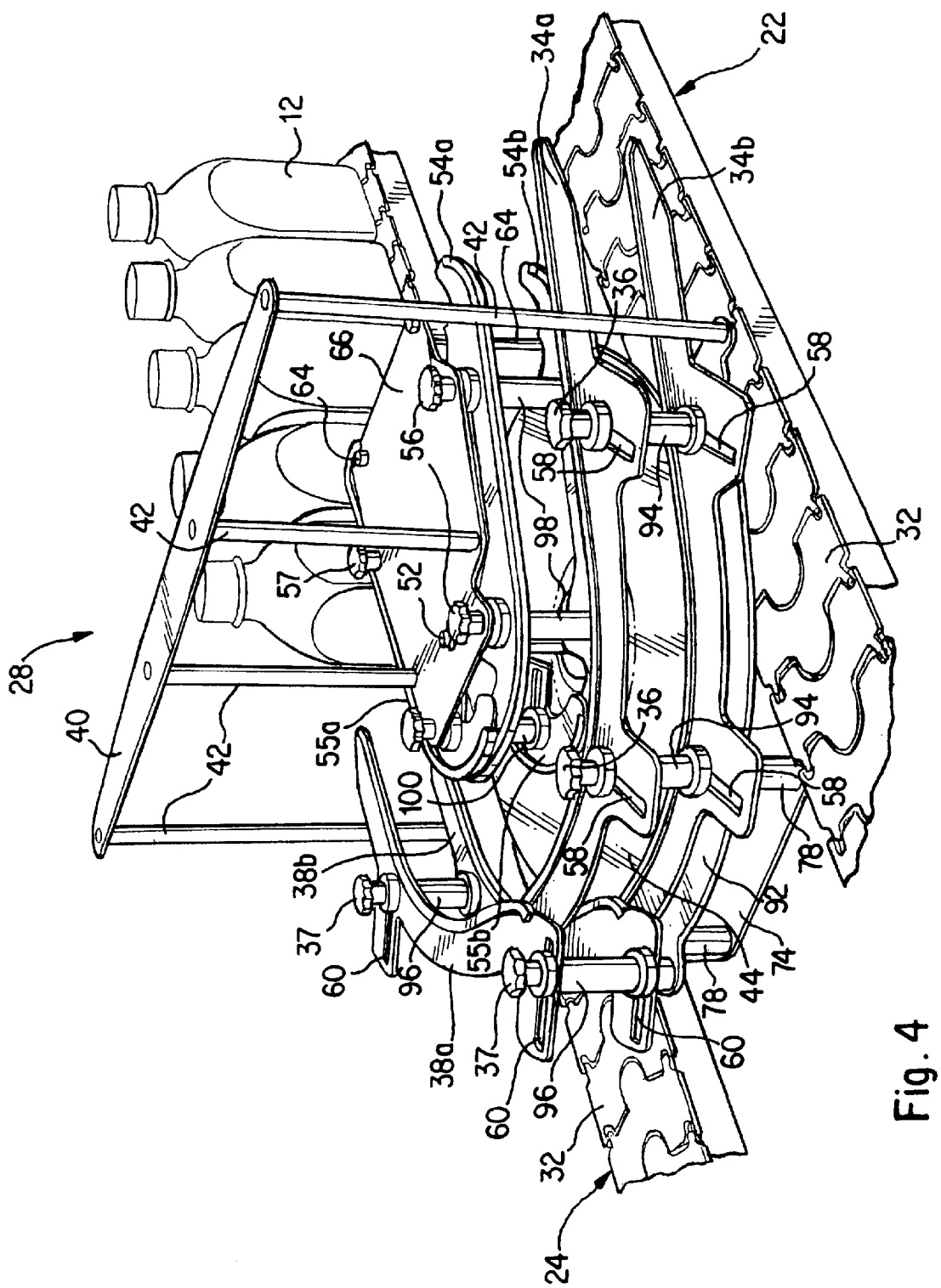
FIG. 4 is a perspective view of one aspect of a transfer device of one embodiment of the present invention. The drawing shows the transfer device located substantially between the first and second conveyor belts, and shows articles being moved from the transfer device onto the second conveyor belt.

The first guide rail 34 may be provided with two first guide rail adjustment slots 58. A first guide rail adjustment knob 36 is placed proximate to each of the first guide rail adjustment slots 58. As can be seen in FIG. 4, the first guide rail adjustment knobs 36 may be used to adjust the first guide rail 34 along the two first guide rail adjustment slots 58. The first guide rail 34 can be secured in place by tightening the two first guide rail adjustment knobs 36. Adjustment of the first guide rail 34 allows for articles 12 of various sizes to be used on the same transfer device 28.

While moving along the transfer plate 44, the articles 12 will contact the second guide rail 38. The second guide rail 38 will then guide the articles 12 onto the second conveyor belt 24, transferring them onto the second conveyor belt 24 in a substantially forward aligned direction. This is because the second guide rail 38 is not angled as is the first guide rail 34. The second guide rail 38 is also provided with two second guide rail adjustment knobs 37 and two second guide rail adjustment slots 60. These slots and knobs are used in the same manner as previously described with the first guide rail 34. Again, the second guide rail 38 is made to be adjustable in order to provide more versatility when using the transfer device 28 with variously sized articles 12.

A first inner guide rail 54 may be provided that is spaced from and facing the first guide rail 34. The first inner guide rail 54 can be variously spaced from the first guide rail 34 by means of two first inner guide rail adjustment knobs 56 and two inner guide rail adjustment slots 62. The first inner guide rail 54 may be moved along the two inner guide rail adjustment slots 62 into a desired position, and then fixed by tightening the two first inner guide rail adjustment knobs 56.

A second inner guide rail 55 may be provided spaced from and facing the second guide rail 38. As with the first inner guide rail 54, the second inner guide rail 55 may be adjusted along two inner guide rail adjustment slots 62. Once the desired position of the second inner guide rail 55 is obtained, two second inner guide rail adjustment knobs 57 are tightened in order to secure the second inner guide rail 55. The guide rails of the embodiment shown in FIG. 2 are therefore adjustable in order to accommodate different sized articles. Also, they may be adjusted in order to provide for a different sized space between that of the first guide rail 34 and the first inner guide rail 54 versus the second guide rail 38 and the second inner guide rail 55.

In one embodiment, an article 12 can be moved on the first conveyor 22 and come into contact with the first guide rail 34. Due to the angled nature of the first guide rail 34, article 12 is pushed in an a t least partially sideways direction onto the transfer plate 44. Article 12 then moves between the guide rails along transfer plate 44 until it reaches a location proximate to the end of the second guide rail 38. Transfer plate 44 is located directly above at least a portion of the second conveyor 24, and the article 12 is transferred from the transfer plate 44 onto the second conveyor 24 in a substantially forward aligned direction. Such a method of putting an object 12 onto a transfer plate 44 and removing an object 12 from a transfer plate 44 is found to be an improvement over the prior art.

As can be seen in the embodiment shown in FIG. 2, the transfer plate 44 overlaps more of the second conveyor 24 than the first conveyor 22. Although the transfer plate 44 is shown above the conveyors 22 and 24, it is to be understood that other embodiments of the present invention can have the overlapping be either above or below, on either or both of the conveyors 22 and 24. All such overlapping combinations are considered to be within the scope of the present invention.

The various embodiments of the present invention therefore include the configuration where more of the transfer plate 44 is above or below the second conveyor 24 than is above or below the first conveyor 22. From such a configuration it will generally follow that an article 12 will be transferred to and from the transfer plate 44 in a different manner. As mentioned above, in some embodiments, the article 12 will move onto the transfer plate 44 from a direction generally to the side of article 12. The front of article 12 is in this instance the direction of travel of article 12 on the first conveyor 22 before reaching the transfer device 28. Consequently, due to having a substantial overlap of the second conveyor 24 with the transfer plate 44, the article 12 will move off of the transfer plate 44 in a generally forward direction. The forward direction of article 12 is in this instance the direction of travel of article 12 on the second conveyor 24 after leaving the proximity of the transfer device 28.

However, it is to be understood that various configurations of overlapping can be envisioned in the present invention, so long as the transfer plate overlaps more of one conveyor than the other.

A driving mechanism is provided in order to affect motion of the transfer plate 44. It should be appreciated that various configurations of a driving mechanism may be used in this regard. Certain aspects of a suitable driving mechanism are shown in FIG. 2. A drive gear 46 is provided between both the first and second conveyors 22 and 24. The drive gear 46 has teeth cut onto its outer surface which mesh with both the first and second conveyors 22 and 24. When the two conveyors are moving at the same speed, the drive gear 46 rotates but does not move relative to either the first or second conveyor 22 and 24. If one of the conveyors is moving at a faster speed than the other, the drive gear 46 will move in the direction of the faster moving conveyor. However, other embodiments may be envisioned where the drive gear's 46 movements do not depend on conveyor movement.

Drive gear 46 may be connected to an internal gear 48. Internal gear 48 is in communication with a pinion 50. The axis shaft 52 which runs through the pinion 50 is located between the first and second conveyors 22 and 24, but not equal distance from both the first and second conveyors 22 and 24. The axis of revolution of shaft 52 is therefore offset from the middle of the two conveyors 22 and 24. The pinion 50 is connected to the transfer plate 44 which shares the same axis of revolution as the pinion 53. Therefore, offsetting pinion 50 allows the transfer plate 44 to be positioned such that an article 12 is transferred onto the transfer plate from the side yet removed from the transfer plate directly onto the second conveyor 24. This offsetting is one way in which to position more of transfer plate 44 to overlap one conveyor. Other ways are still within the scope of the present invention.

A top support member 40 having four support rods 42 may be provided. As seen in FIG. 4, the support rods 42 are connected to a bottom support member 92. The purpose of these elements is to provide for support of the guide rails and hence make the inner and outer parts of the transfer device 28 be a rigid body.

FIG. 4 shows a perspective view of an embodiment of the transfer device 28 having the inner top plate 66 not cut away as in FIG. 2. The first inner guide rail 54 is composed of an upper section 54A and a lower section 54B. Having a guide rail with two contact points is advantageous when moving taller articles 12 such as the bottles shown in FIG. 4. Both the upper and lower section of the first inner guide rail 54A and 54B are provided with slots 62 in order to adjust the first inner guide rail 54 along the two first inner guide rail adjustment shafts 98. Various ways of providing adjustment is still within the scope of the present invention.

Two inner support rods 64 are provided in order to help secure the bottom support member 92 with the inner top plate 66.

FIG. 4 also shows the second inner guide rail 55 having an upper section 55A and a lower section 55B as like the first inner guide rail 54. The second inner guide rail 55 is provided with two second inner guide rail adjustment shafts 100. The second inner guide rail 55 is adjusted via slots 62 along the two second inner guide rail adjustment shafts 100 in order to provide for the desired positioning of the second inner guide rail 55.

As with the inner guide rails, the first guide rail 34 is shown in the embodiment in FIG. 4 as having an upper section 34A and a lower section 34B. Two first guide rail adjustment shafts 94 are placed between the upper and lower sections 34A and 34B in order to allow for adjustment of the first guide rail 34. The two first guide rail adjustment shafts 34 are attached on one end to the bottom support member 92. Also shown in FIG. 4 is a second guide rail 38 which has both an upper section 38A and a lower section 38B. Two second guide rail adjustment shafts 96 are located between the upper and lower sections 38A and 38B. The second guide rail 38 may be adjusted by moving the second guide rail adjustment shafts 96 relative to the slots 60. The two second guide rail adjustment shafts 96 are connected on one end to the bottom support member 92.

Figure 3:
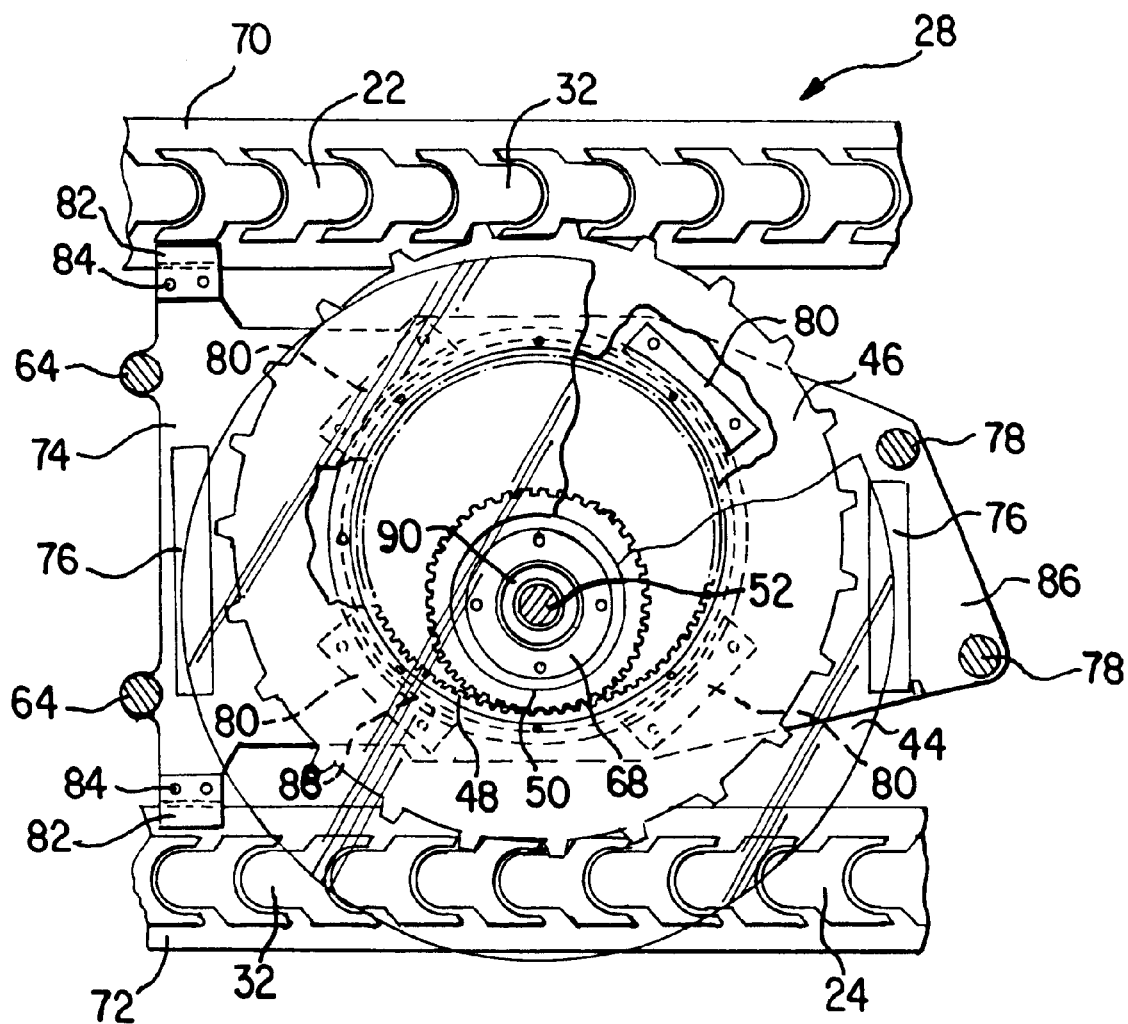
FIG. 3 is a plan view of an embodiment of a transfer device of the present invention. This drawing focuses mainly on the gearing mechanism and inner bottom plate of the transfer device. The transfer plate and drive gear are partially cut away, and the guide rails and related structure are not shown.

FIG. 3 shows an alternative embodiment of a transfer device 28. The drawing shows the first conveyor 22 having a first conveyor frame 70 and the second conveyor 24 having a second conveyor frame 72. Slide blocks 82 are provided on either end of the inner bottom plate 74 in order to provide for a sliding engagement of the transfer device 28 with the first and second conveyor frames 70 and 72. The slide blocks 82 are each provided with a set of spacers 84 to properly position them on the frames 70 and 72. The inner bottom plate 74 has a pair of inner support rods 64 on one end and a pair of outer support rods 78 on an opposite end. The inner bottom plate 74 also has a pair of support blocks 76.

FIG. 3 shows how the drive gear 46 meshes with the links 32 which form both the first and second conveyors 22 and 24. The driving mechanism is provided with four bearing members 80 positioned around an internal gear guide 88 and the internal gear 48. A hub 90 is partially contained within a sandwiched disk plate 68 and partially surrounds the axis shaft 52.

Figure 5:
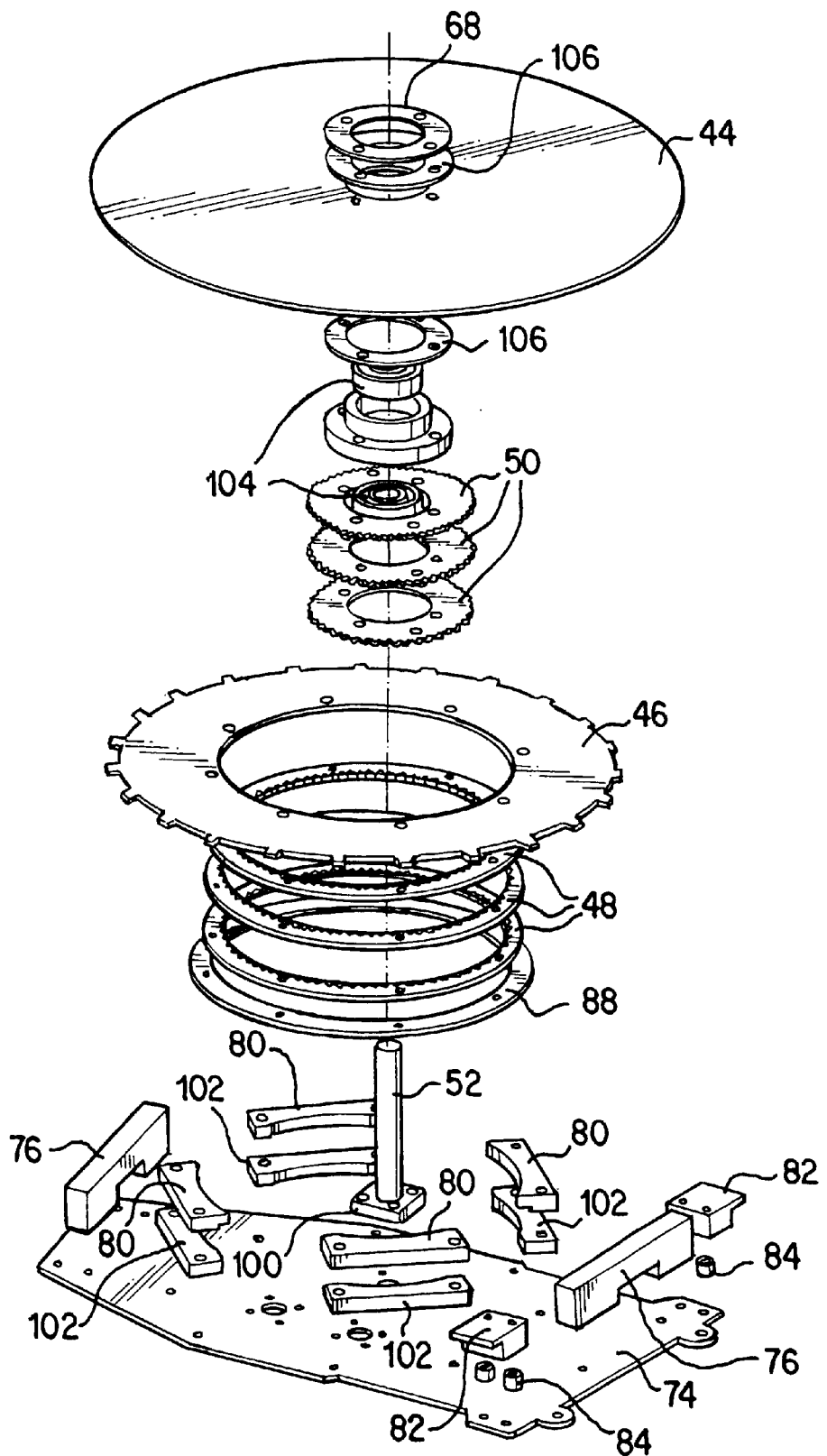
FIG. 5 is an assembly view of the driving mechanism and related structure of one embodiment of the present invention. The drawing shows one possible configuration of the transfer plate, drive gear, pinion, internal gears, bearings, and inner bottom plate of the present invention.

FIG. 5 shows an embodiment of the drive mechanism in greater detail. Four bearing cups 102 are placed on the inner bottom plate 74. The bearing members 80 are placed on top of the four bearing cups 102. An axis shaft block 100 may be placed in the center of the four bearing cups 102 and is attached to the inner bottom plate 74. Axis shaft 52 is shown in FIG. 5 as a spindle, and is connected on one end to the axis shaft block 100. An internal gear guide 88 may be located proximate to the four bearing members 80. The internal gear 48 is shown as three separate but equal pieces which are attached to one another. They are attached to the drive gear 46. Pinion 50 is shown as three, separate but equal pieces which are connected to one another. Pinion 50 may mesh with internal gear 48 and is located on the axis shaft 52. Two radial bearings 104 are provided on the axis shaft 52. A hub 90 may be located on the axis shaft 52 and is between both of the radial bearings 104. A washer 106 is located on the axis shaft 52 and is attached to the transfer plate 44 which is also located on the axis shaft 52. A second washer 106 is located on the opposite side of the transfer plate 44. A sandwich disk plate 68 is located on top of this second washer 106 and is further located on the axis shaft 52.

Figure 6:
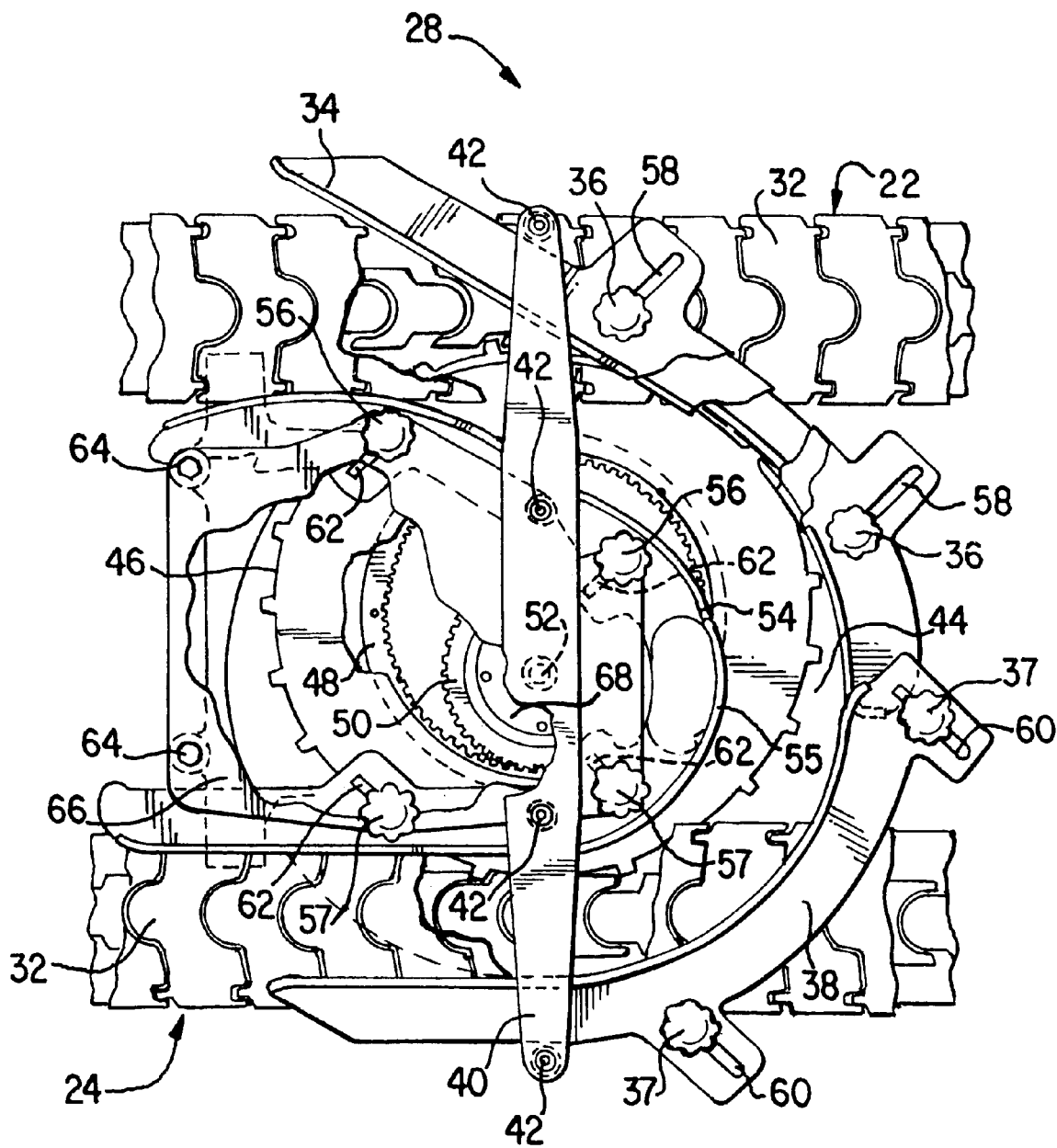
FIG. 6 is a plan view of an alternate embodiment of the transfer device of the present invention. Here, the transfer device overlaps the first conveyor and is below the first conveyor.

FIG. 6 shows an embodiment of the apparatus 10 where the transfer device 28 overlaps the first conveyor 22 and is under the first conveyor 22. Also, the transfer device 28 overlaps the second conveyor 24 and is below the second conveyor 24.

Although the described embodiments of the present invention show a specific driving mechanism and a specific way of adjusting the guide rails, it is to be understood that the scope of the present invention is not limited to the particular driving mechanism shown or the particular way of adjusting the guide rails.

It should be understood that the invention includes various modifications that can be made to the embodiments of the transfer device described herein as come with the appended claims and their equivalents.

What is claimed is:

1. An apparatus for the transfer of articles, comprising:
   a first conveyor moving in a first direction, the first conveyor having a first conveyor width;
   a second conveyor moving in a second direction opposite from the first direction, the second conveyor spaced from the first conveyor, the second conveyor having a second conveyor width;
   a transfer device substantially disposed between the first and second conveyors, comprising:
   a substantially circular transfer plate used to transfer articles between the first and second conveyors, the transfer plate overlapping more of the second conveyor than the first conveyor, such that the transfer plate extends across more of the second conveyor width than the first conveyor width.

2. The apparatus for the transfer of articles of claim 1, wherein the transfer plate is a rotating disk.

3. The apparatus for the transfer of articles of claim 1, wherein the transfer device has a drive gear that engages both the first and second conveyor.

4. The apparatus for the transfer of articles of claim 3, wherein the transfer device has a pinion having an axis of revolution that is offset from the middle of the distance between the first and second conveyors.

5. The apparatus for the transfer of articles of claim 4, wherein the transfer device has an internal gear connected to the drive gear, the pinion is in communication with the internal gear and is connected to the transfer plate.

6. The apparatus for the transfer of articles of claim 1, wherein the transfer device is capable of moving in a direction of travel of one of the two conveyor belts.

7. The apparatus for the transfer of articles of claim 6, wherein the transfer device moves in the direction of travel of the faster moving conveyor belt.

8. An apparatus for the transfer of articles, comprising:
   a first conveyor moving in a first direction;
   a second conveyor moving in a second direction opposite from the first direction, the second conveyor spaced from the first conveyor;
   a transfer device substantially disposed between the first and second conveyors, comprising:
   a transfer plate used to transfer articles between the first and second conveyors, the transfer plate overlapping more of the second conveyor than the first conveyor, wherein the portion of the transfer plate that overlaps the first conveyor is below the first conveyor.

9. The apparatus for the transfer of articles of claim 1, wherein the portion of the transfer plate that overlaps the second conveyor is above the second conveyor.

10. The apparatus for the transfer of articles of claim 3, wherein the rotation from the drive gear is transmitted to the transfer plate to cause rotation of the transfer plate.

11. A transfer device for the transfer of articles from a first conveyor belt to a second conveyor belt, the transfer device comprising:
    a transfer plate used to transfer articles from the first conveyor belt to the second conveyor belt, the transfer plate overlapping more of the second conveyor belt than the first conveyor belt, such that the transfer plate extends across more of the width of the second conveyor belt than the width of the first conveyor belt; and
    a guide rail mechanism located proximate to the first and second conveyor belts and disposed to direct the articles from the transfer plate onto the second conveyor.

12. The apparatus for the transfer of articles of claim 11, wherein the transfer plate is a rotating disk.

13. The apparatus for the transfer of articles of claim 11, wherein the transfer device has a drive gear that engages both the first and second conveyor belt.

14. The apparatus for the transfer of articles of claim 13, wherein the transfer device has a pinion having an axis of revolution that is offset from the middle of the first and second conveyor belts.

15. The apparatus for the transfer of articles of claim 14, wherein the transfer device has an internal gear connected to the drive gear, the pinion is in communication with the internal gear and is connected to the transfer plate.

16. The apparatus for the transfer of articles of claim 11, wherein the transfer device is capable of moving in a direction of travel of one of the two conveyor belts.

17. The apparatus for the transfer of articles of claim 16, wherein the transfer device moves in the direction of travel of the faster moving conveyor belt.

18. A transfer device for the transfer of articles from a first conveyor belt to a second conveyor belt, the transfer device comprising:
   a transfer plate used to transfer articles from the first conveyor belt to the second conveyor belt, the transfer plate overlapping more of the second conveyor belt than the first conveyor belt, wherein the portion of the transfer plate that overlaps the first conveyor belt is below the first conveyor belt; and
   a guide rail mechanism located proximate to the first and second conveyor belts and disposed to direct the articles from the transfer plate onto the second conveyor.

19. The apparatus for the transfer of articles of claim 11, wherein the portion of the transfer plate that overlaps the second conveyor belt is above the second conveyor belt.

20. The apparatus for the transfer of articles of claim 9, wherein the rotation from the gear is transmitted to the transfer plate to cause rotation of the transfer plate.

21. An apparatus for the transfer of articles, comprising:
   a first conveyor moving in a first direction;
   a second conveyor moving in a second direction opposite from the first direction, the second conveyor spaced from the first conveyor;
   a gear engaging both the first and second conveyors, the gear rotates in response to movement of the first and second conveyors;
   a drive train that transfers rotation from the gear to a transfer plate;
   a transfer plate that rotates, the transfer plate is located substantially between the first and second conveyors, the transfer plate is used to transfer articles from the first conveyor to the second conveyor, the axis of revolution of the transfer plate is offset from the middle of the first and second conveyors.

* * * * *